(12) United States Patent
Chen et al.

(10) Patent No.: US 6,747,123 B2
(45) Date of Patent: Jun. 8, 2004

(54) ORGANOSILICATE MATERIALS WITH MESOSCOPIC STRUCTURES

(75) Inventors: Cheng-Hsuan Chen, New Providence, NJ (US); Shu Yang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/098,286

(22) Filed: Mar. 15, 2002

(65) Prior Publication Data

US 2003/0175534 A1 Sep. 18, 2003

(51) Int. Cl.[7] ............................................. C08G 77/06
(52) U.S. Cl. ........................................ 528/480; 528/12
(58) Field of Search ................... 528/12, 480

(56) References Cited

U.S. PATENT DOCUMENTS

| | | | |
|---|---|---|---|
| 5,248,734 A | 9/1993 | Ober et al. | 525/328.8 |
| 5,348,687 A | 9/1994 | Beck et al. | 252/582 |
| 5,665,527 A | 9/1997 | Allen et al. | 430/325 |
| 5,922,299 A | 7/1999 | Bruinsma et al. | 423/335 |
| 5,948,470 A | 9/1999 | Harrison et al. | 427/198 |
| 6,027,666 A | 2/2000 | Ozin et al. | 252/301.4 R |
| 6,319,427 B1 | 11/2001 | Ozin et al. | 252/301.4 F |
| 6,329,070 B1 | 12/2001 | Sass et al. | 428/612 |
| 6,379,874 B1 | 4/2002 | Ober et al. | 430/322 |
| 6,387,453 B1 * | 5/2002 | Brinker et al. | 427/387 |
| 6,409,907 B1 | 6/2002 | Braun et al. | 205/317 |
| 6,465,387 B1 * | 10/2002 | Pinnavaia et al. | 502/158 |
| 6,471,761 B2 * | 10/2002 | Fan et al. | 106/287.16 |
| 6,583,071 B1 * | 6/2003 | Weidman et al. | 438/787 |

FOREIGN PATENT DOCUMENTS

| | | | |
|---|---|---|---|
| WO | WO 01/31404 A1 | 5/2001 | G03F/7/30 |
| WO | WO 01/42540 A1 | 6/2001 | C30B/33/00 |
| WO | WO 01/51990 A1 | 7/2001 | G03C/5/00 |

OTHER PUBLICATIONS

"Mesoporous Silicate–Surfactant Composites with Hydrophobic Surfaces and Tailored Pore Sizes", Sayari et al., Journal of Physical Chemistry B (2202) 106,10096.*

U.S. patent application Ser. No. 10/040,017, Megens et al., filed Jan. 14, 2002.

U.S. patent application Ser. No. 10/321,027, Reichmanis et al., filed Dec. 17, 2002.

Sundararajan, N., et al., "Supercritical $CO_2$ Processing for Submicron Imaging of Fluoropolymers," *Chemistry of Materials*, vol. 12, No. 1, Jan. 2000, pps. 41–48.

A.J. Turberfield, "Photonic Crystals Made By Holographic Lithography", MRS. Bulletin, Aug. 2001, pp. 632–636.

M. Campbell, et al., "Fabrication Of Photonic Crystals For The Visible Spectrum By Holographic Lithography," Nature, vol. 404, Mar. 2, 2000, pp. 53–56.

K.M. Ho, et al., "Existence Of A Photonic Gap In Periodic Dielectric Structures," Physical Review Letters, vol. 65, No. 25, Dec. 17, 1990, pp. 3152–3155.

E. Ozbay, et al., "Measurement Of A Three–Dimensional Photonic Band Gap In Crystal Structure Made Of Dielectric Rods," Physical Review B, vol. 50, No. 3, Jul. 15, 1994, pp. 1945–1948.

A. Tuberfield, "Photonic Crystals Made By Holographic Lithography" ABSTRACT from Symposium K, Microphotonics–Materials, Physics, and Applications, Nov. 26–29, 2001.

S. Shoji et al., "Photofabrication Of Three–Dimensional Photonic Crystals By Multibeam Laser Interference Into A Photopolymerizable Resin," Applied Physics Letters, vol. 76, No. 19, May 8, 2000, pp. 2668–2670.

Kresge, C.T. et al: "*Ordered mesoporous molecular sieves synthesized by a liquid–crystal template mechanism*" Nature, vol. 359, Oct., 1992, pp. 710–712.

Tanev, Peter T. et al: "*A Neutral Templating Route to Mesoporous Molecular Sieves*" Science, vol. 267, Feb., 1995, pp. 865–866.

Huo, Q. et al: "*Generalized synthesis of periodic surfactant/ inorganic composit materials*" Nature, vol. 368, Mar., 1994, pp. 317–321.

Sanchez, C. et al: "*Design and Properties of Hybrid Organic–Inorganic Nanocomposites for Photonics*" Mrs Bulletin, May, 2001, pp. 377–387.

Yang, P. et al: "*Hierarchically Ordered Oxides*" Science, vol.282, Dec. 1998, pp. 2244–2246.

Templin, M. et al: "*Organically Modified Aluminosilicate Mesostructures from Block Copolymer Phases*" Science, vol. 278, Dec., 1997, pp. 1795–1798.

Raman, N. K. et al: "*Template–Based Approaches to the Preparation of Amorphous, Nanoporous Silicas*" Chemical Mater, vol. 8, Feb. 1996, pp. 1682–1701.

Yang P. et al: "*Block Copolymer Templating Syntheses of Mesoporous Metal Oxides with Large Ordering Lengths and Semicrystalline Framework*" Chemical Mater, vol. 11, 1999, pp. 2813–2826.

Brinker, C. J. et al: "*Evaporation–Induced Self–Assembly: Nanostructures Made Easy\*\**" Advanced Materials, vol. 11, 1999, pp. 579–585.

Vlasnov et al, "On–Chip Natural Assembly of Silicon Photonic Bandgap Crystals," Nature vol. 414, Nov. 15, 2001, pp. 289–293.

Baney et al, "Silsesquioxanes," American Chemical Society, 1995, pp. 1409–1430.

* cited by examiner

Primary Examiner—Robert Dawson
Assistant Examiner—Marc Zimmer
(74) Attorney, Agent, or Firm—John F. McCabe

(57) ABSTRACT

Template-based methods fabricate organosilicate materials with mesoscopic structures. The methods include providing solutions of amphiphilic template molecules, mixing amphiphilic organosilicate precursors into the solutions to form mixtures, and evaporating solvent from the mixtures. The evaporation steps produce composites in which the amphiphilic organosilicate precursors have nontrivial mesoscopic structures.

13 Claims, 6 Drawing Sheets

ORGANOSILICATE MATERIALS WITH MESOSCOPIC STRUCTURES

BACKGROUND

1. Field of the Invention

This invention relates to organosilicate materials.

2. Description of the Related Art

Some techniques use structured phases of amphiphilic block copolymer molecules as templates for fabricating polymeric materials with mesoscopic structures. The block copolymer molecules self-assemble into stable structures with mesoscopic structures when their concentrations and temperatures are in specific ranges. Since block copolymer molecules have phases with different types of mesoscopic structure, these template-based techniques have been used to fabricate polymeric materials with a variety of types of mesoscopic structures.

Typical template-based methods involve several fabrication steps. The methods include making a starting solution that contains both block copolymer molecules and monomers for making the desired material. In the starting solution is a uniform solution of the two types of molecules. The methods include evaporating solvent from the starting solution until the concentration of block copolymer molecules achieves a concentration for which the stable phase for block copolymer molecules has a nontrivial mesoscopic structure. At this concentration, the block copolymer molecules self-assembly into the nontrivial structure. Self-assembly by the block copolymer molecules causes the monomers, which are intermixed with the block copolymer molecules, to also condense into a similar or different mesoscopic structure. The methods include heating the material with the mesoscopic structure to polymerize the monomers into a solid whose structure is fixed by the condensation.

The template-based methods have used alkoxide monomers to fabricate polymeric materials with a variety of morphologies. These morphologies include spherical, cylindrical, lamellae, and gyroid structures. But, the alkoxide precursors typically produce polymeric materials wettable by water.

SUMMARY

Various embodiments of template-based methods fabricate organosilicate materials with mesoscopic structures from precursors having hydrophobic moieties. The hydrophobic moieties can cause changes to affinities towards water during curing, e.g., due to shedding of reactive hydrophilic moieties. Such changes can destroy template-induced structures, which are based on interactions between hydrophilic and hydrophobic moieties. The affinity changes can cause precursors to phase separate so that the previously produced mesoscopic structures are destroyed. Curing-induced phase separations have impeded the successful use of alkoxide precursors having hydrophobic moieties in the production of materials with mesoscopic structures.

Various embodiments eliminated curing-induced destruction of mesoscopic structures by using precursors that remain amphiphilic during curing. In particular, the precursors include both hydrophobic and hydrophilic moieties, and the respective hydrophobic and hydrophilic characters of these moieties are unchanged by the curing reactions that crosslink composites. Thus, crosslinking does not cause drastic changes in molecular affinities of the organosilicate precursors.

One embodiment features a template-based method for fabricating an organosilicate material with a mesoscopic structure. The method includes providing a solution of an amphiphilic template molecules, mixing amphiphilic organosilicate precursors into the solution to form a mixture, and evaporating solvent from the mixture. The evaporation produces a composite in which the amphiphilic organosilicate precursors have a nontrivial mesoscopic structure.

Another embodiment features a solid that includes crosslinked amphiphilic organosilicate precursors. The amphiphilic organosilicate precursors form a matrix with an array of micro-structures dispersed in the matrix.

DETAILED DESCRIPTION OF EMBODIMENTS

Herein precursors are monomers or oligomers that can be crosslinked or polymerized.

Various embodiments use inhomogeneous phases of template molecules to produce organosilicate materials with nontrivial mesoscopic structures. Self-assembly of the template molecules into nontrivial mesoscopic structures causes amphiphilic organosilicate precursors to arrange themselves in similar structures due to strong interactions between various portions of the two types of molecules. In particular, interactions cause either hydrophilic or hydrophobic portions of the two types of molecules to assemble themselves in adjacent or overlapping physical regions.

The various embodiments avoid destruction of template-induced structure by using organosilicate precursors whose hydrophilic affinities are stable to curing. In particular, the organosilicate precursors are amphiphilic both before and after curing. Thus, curing does not produce drastic changes in affinities of organosilicate molecules for water. Such drastic changes in affinities could otherwise significantly physical rearrange the precursors thereby causing a loss of mesoscopic structure during curing.

Some of the embodiments of template-based fabrication methods produce organosilicate materials that are not hydrophilic. In these materials, the presence of hydrophobic moieties causes the materials to be resistant to absorption of water. In some of the materials, hydrophobic moieties of the original organosilicate precursors are concentrated on external surfaces thereby making the materials non-wettable by water.

Figure 1A:
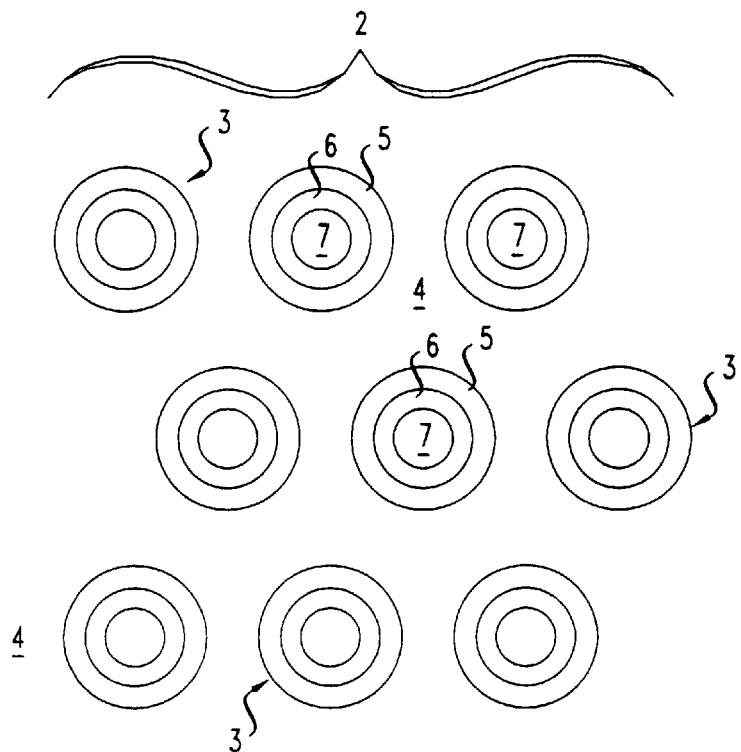
FIG. 1A is a cross-sectional view of a composite with an ordered array of cylindrical micro-structures therein.
Figure 1B:
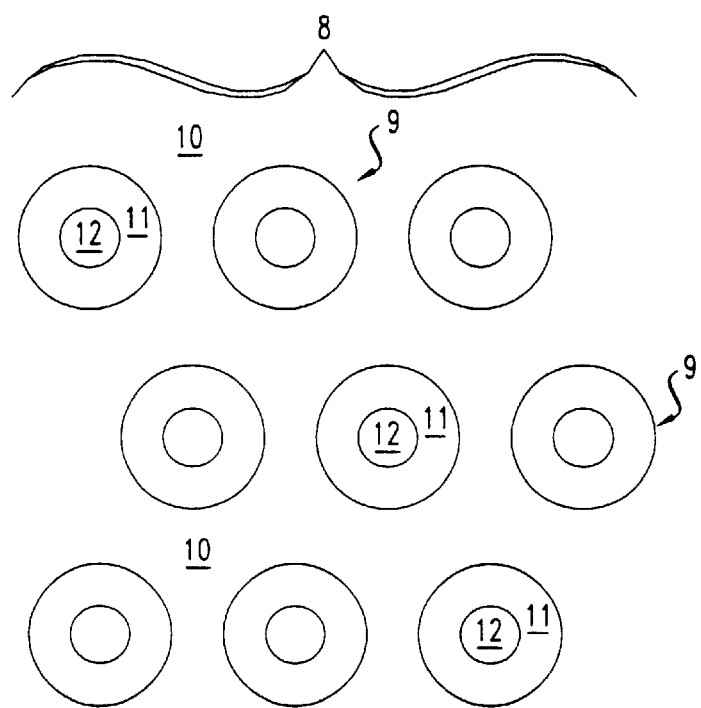
FIG. 1B is a cross-sectional view of another composite with an ordered array of cylindrical micro-structures therein.
Figure 1C:
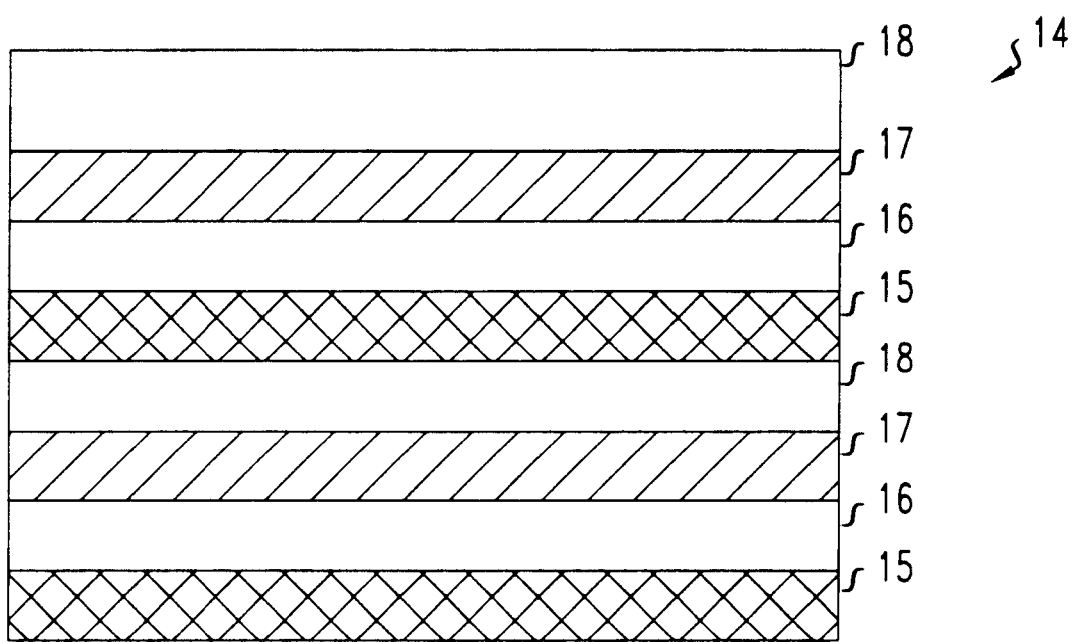
FIG. 1C is a cross-sectional view of another composite with an ordered array of lamellar micro-structures therein.

Structures of several organosilicate composites with nontrivial mesoscopic structures are illustrated in the cross-sectional views of FIGS. 1A–1C. A composite or solid with a nontrivial mesoscopic structure has an array of micro-structures dispersed therein. Exemplary micro-structures include cylindrical, gyroid, lamellar, or spherical-type structures. In composites and materials with such structures, typical diameters of cylindrical or spherical-type micro-structures, thicknesses of lamellar micro-structures, and inter micro-structure distances are typically in a range of about 2 nanometers (nm) to about 200 nm.

FIG. 1A shows a composite 2 of amphiphilic organosilicate precursors and amphiphilic template molecules, e.g., surfactants or block copolymers. The composite 2 includes an array of cylindrical micro-structures 3 dispersed in a matrix 4. The micro-structures 3 have the same diameter, e.g., about 2–200 nm, and include outer annular regions 5, inner annular regions 6, and cores 7. The outer annular regions 5 and matrix 4 contain respective hydrophobic portions and hydrophilic portions of the organosilicate precursors. The inner annular regions 6 and cores 7 contain respective hydrophilic blocks and hydrophobic blocks of the template molecules and function as a template. The hydrophilic portions of organosilicate precursors and template molecules are physically adjacent, because this physical arrangement leads to a lower free energy under the temperature and concentration conditions for the composite 2.

FIG. 1B shows another composite 8 of amphiphilic organosilicate precursors and amphiphilic template molecules, e.g., surfactants or block copolymers. The composite 8 includes a uniform array of cylindrical micro-structures 9 dispersed in a matrix 10. The cylindrical micro-structures 9 include annular regions 11 and cores 12. The annular regions 11 contain a uniform material containing hydrophilic portions of both the organosilicate precursors and the template molecules. The cores 12 contain hydrophobic portions of the template molecules. The matrix 10 contains hydrophobic portions of the organosilicate precursors. Hydrophilic portions of the organosilicate precursors and the template molecules intermingle in the same physical region, because this physical arrangement leads to a lower free energy under the temperature and concentration conditions for making the composite 8.

Other composites and solids of amphiphilic organosilicate precursors and amphiphilic template molecules (not shown) have uniform or random arrays of spherical-type micro-structures. The morphologies of these arrays of micro-structures have the forms already shown for the arrays of cylindrical micro-structures 3, 9 in the cross-sectional views of the composites 2, 8 of FIGS. 1A and 1B.

FIG. 1C shows a portion of an organosilicate composite 14 that includes an array of lamellae 15–18. The lamellae 15 and 16 contain respective hydrophilic and hydrophobic bocks of amphiphilic organosilicate precursors. The lamellae 17 and 18 contain respective hydrophobic and hydrophilic blocks of amphiphilic template molecules, e.g., block copolymers. In the composite 14, hydrophilic portions of organosilicate precursors and template molecules occupy physically adjacent lamellae 15, 18, and hydrophilic portions of organosilicate precursors and copolymer molecules occupy physically adjacent lamellae 16, 17. In other embodiments (not shown), either hydrophobic portions or hydrophilic portions of both types of molecules intermix in the same lamellae.

Figure 2:
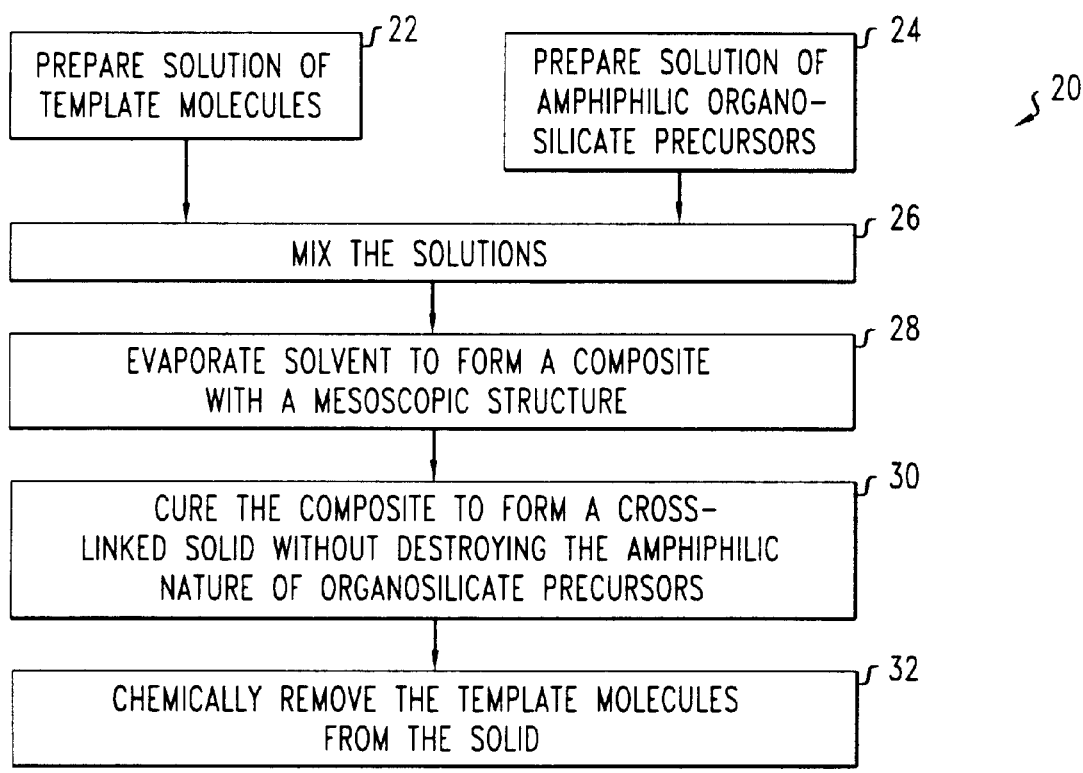
FIG. 2 is a flow chart illustrating a method for fabricating an organosilicate solid with a nontrivial mesoscopic structure.

FIG. 2 illustrates a method 20 for constructing an organosilicate material with a mesoscopic structure from a homogeneous solution containing amphiphilic template molecules. Herein, template molecules are molecules that tend to self-assemble into composites with nontrivial physical mesoscopic structures under certain conditions, e.g., concentration and temperature. Exemplary template molecules include small molecule surfactants and block copolymers. The type of mesoscopic structure formed by such molecules depends on the type of template molecules, the molecular concentration of the molecules, and/or the temperature.

The method 20 includes preparing a starting solution of the amphiphilic template molecules (step 22). The concentration and temperature of the starting solution is typically selected to produce a homogeneous solution of the template molecules, i.e., in a phase without a mesoscopic structure.

Method 20 also includes providing a second solution of amphiphilic organosilicate precursors, i.e., organosilicate monomers or organosilicate oligomers capable of being crosslinked (step 24). The organosilicate precursors have functional groups supporting crosslinking reactions. The organosilicate precursors also have both hydrophobic moieties and hydrophilic moieties that maintain their respective hydrophilic and hydrophobic natures under conditions of the crosslinking reactions. Exemplary organosilicate precursors are already partially crosslinked to produce amphiphilic molecules of desired molecular weights.

Method 20 also includes mixing the two solutions to form a new solution that contains both the amphiphilic organosilicate precursors and the template molecules (step 26). The new solution is a homogeneous solution and typically does not have mesoscopic structure under the mixing conditions.

Method 20 includes evaporating solvent from the new solution, i.e., containing both the template molecules and organosilicate precursors and thereby causing the formation of a composite with a nontrivial mesoscopic structure (step 28). To produce the evaporation, the solution is heated. The evaporation causes a phase with a mesoscopic structure to become more stable than the phase in which the template molecules are homogeneously distributed in the solvent. Thus, the evaporation causes the amphiphilic template molecules physically condense or self-assemble into a composite with the nontrivial mesoscopic structure.

In the nontrivial mesoscopic structure, hydrophobic and hydrophilic blocks of the template molecules are distributed in separate physical regions. This physical separation of the hydrophobic and hydrophilic portions of the amphiphilic template molecules induces a similar physical self-assembly of the amphiphilic organosilicate precursors. The self-assemble produces a composite of both the organosilicate precursors and the template molecules, e.g., composites 2, 8, 14 of FIGS. 1A, 1B, or 1C. In these composites, either the hydrophilic or the hydrophobic portions of both the organosilicate precursors and template molecules are concentrated in physically neighboring or overlapping regions. The hydrophilic portions of both types of molecules occupy separate physical regions than the hydrophobic portions of these molecules.

Method 20 also includes curing the physical composite, which has a nontrivial mesoscopic structure, to form a crosslinked solid (step 30). Curing results from heating or irradiating the composite to stimulate chemical reactions among functional groups on the organosilicate precursors. These reactions produce chemical crosslinks, i.e., bonds, between the organosilicate precursors and cause the precursors to lose hydrophilic moieties. During curing, organosilicate precursors remain amphiphilic, because the precursors have both hydrophobic moieties and hydrophilic moieties that are either unreactive under the reaction conditions or react without changing their affinities for water. Thus, curing does not cause drastic changes to affinities of the organosilicate precursors for water. For example, curing does not change the precursors from hydrophilic or amphiphilic molecules into hydrophobic molecules.

Eliminating drastic changes in affinities of the organosilicate precursors for water is important to maintaining the template-induced mesoscopic structure as curing progresses. Other attempts to fabricate hydrophobic materials with mesoscopic structures from precursors with alkoxide functional groups failed, because the precursors changed from amphiphilic to hydrophobic during curing. Prior to curing hydrophilic portions of those precursors were physically neighboring to or intermixed with hydrophilic regions of the template in composites whose organosilicate components had nontrivial mesoscopic structures, e.g., as shown in FIGS. 1A, 1B, and 1C. Nevertheless, the organosilicate precursors rearranged themselves as curing progressed due to their drastic affinity changes. As the organosilicate precursors became hydrophobic during curing their original physical positions near hydrophilic regions of the template molecules became unstable. This caused the organosilicate precursors to rearrange and destroyed the template-produced structure, i.e., producing a crosslinked solid without a mesoscopic structure.

Referring again to FIG. 2, method 20 also includes performing a chemical treatment on the crosslinked solid produced at step 30 to remove part or all of the block copolymer template molecules (step 32). Exemplary chemical treatments include: burning or dissolving template molecules out of the solid, using ozonolysis to break backbones of the template molecules thereby releasing the constituents from the solid, or using an $O_2$ plasma reactive ion etch (RIE) to remove template molecules. Removing the template molecules produces a porous organosilicate solid.

Figure 3:
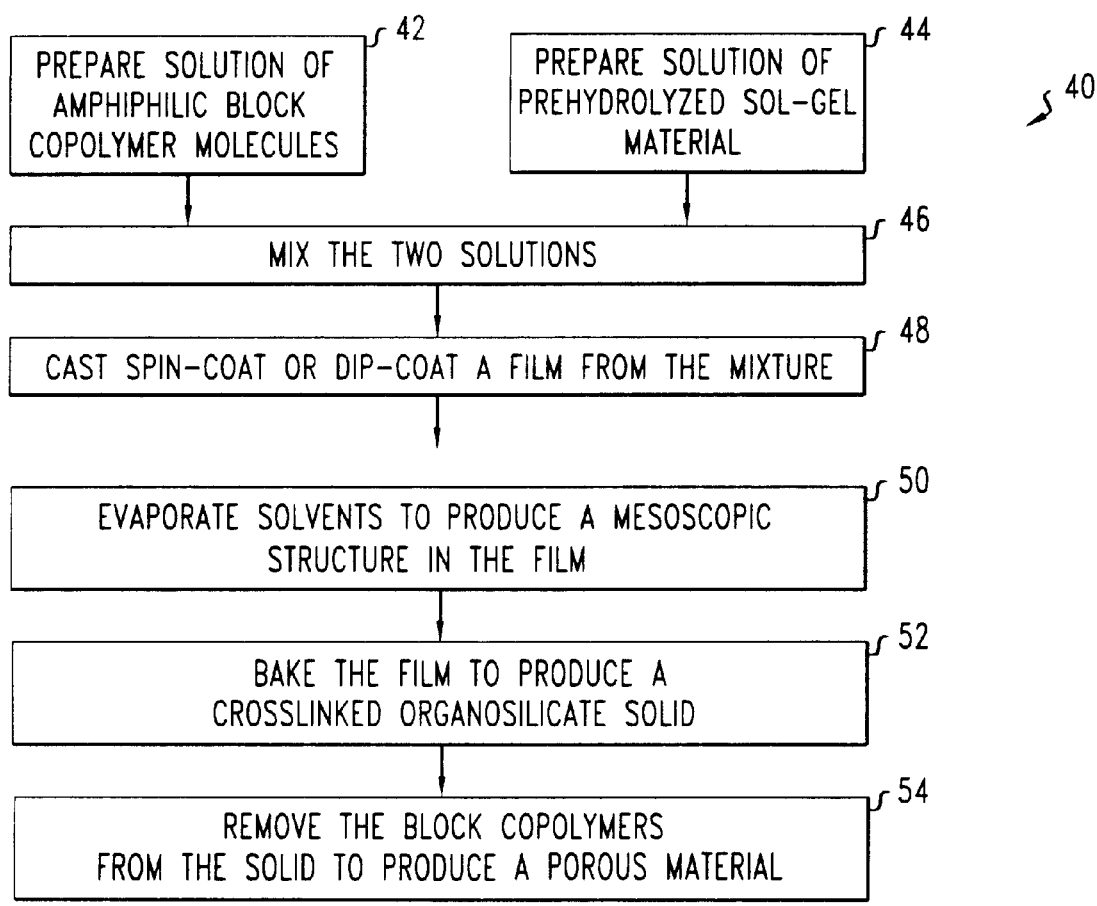
FIG. 3 is a flow chart illustrating a specific embodiment of the method of FIG. 2 that is based on a sol-gel reaction.

FIG. 3 illustrates a particular method 40 for making organosilicate materials according to method 20 of FIG. 2. In the method 40, the template molecules are the block copolymer molecules poly(butadiene)$_n$-b-poly(ethylene oxide)$_m$ (PBu-b-PEO). In PBu-b-PEO, the poly(butadiene)$_n$ block and poly(ethylene oxide)$_m$ block are the respective hydrophobic and hydrophilic blocks of the amphiphilic block copolymer. The integers n and m, which characterize the chain length of these blocks and have values of about 10–20,000 and preferably have values of about 50–1,000. Varying the values of n and m enable making templates for different mesoscopic structures.

The method 40 includes preparing a starting solution of the amphiphilic block copolymer PBu-b-PEO (step 42). The starting solution includes about 5 weight % PBu-b-PEO in a solvent that is an approximate 50/50 volume % mixture of chloroform and tetrahydrofuran. The 50/50 volume % solvent mixture both dissolves the block copolymer molecules and produces a solvent compatible with prehydrolyzed sol-gel material, i.e., a prehydrolyzed sol-gel mater dissolves into this solvent mixture. The starting solution is homogenous at the above starting weight % concentration and room temperature.

The method 40 also includes preparing an aqueous solution of a prehydrolyzed sol-gel material, i.e., a solution of organosilicate precursors (step 44). The sol-gel material is itself formed by reacting two silicate alkoxide monomers. One monomer is $(CH_3)Si(OCH_2CH_3)_3$ (MTEOS), which has a hydrophobic $CH_3$ moiety. The other monomer is $(CH_3O)_3Si(CH_2)_3OCH_2(CHCH_2O)$ (GLYMO), which has the hydrophilic moiety, $(CH_2)_3OCH_2(CHCH_2O)$. The hydrophobic moiety, $CH_3$, and hydrophilic moiety, $(CH_2)_3OCH_2(CHCH_2O)$, do not react during prehydrolysis of the sol-gel material and do not change their respective hydrophobic and hydrophilic natures during subsequent curing.

Other embodiments use different silicate alkoxide silicates to prepare the sol-gel material. Alternate silicate alkoxides for the monomer with a hydrophobic moiety include methyltriethoxysilane, phenyltriethoxysilane, n-octyltriethoxysilane, and tridecafluoro-1,1,2,2-tetrahydrooctyltriethoxysilane. Alternate silicate alkoxides for the monomer with a hydrophilic moiety include 3-glycidoxypropyltrimethoxysilane, mercaptopropyltrimethoxysilane (MPS), and aminopropyltrimethoxysilane (APS).

Figure 4:
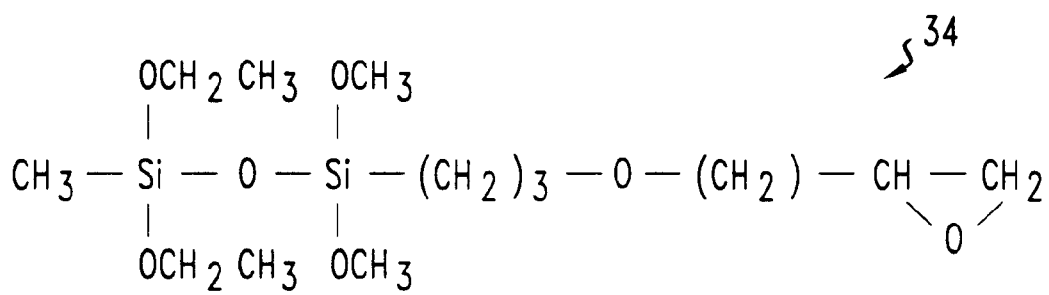
FIG. 4 shows an amphiphilic organosilicate molecule produced during prehydrolysis of a sol-gel material used in the method of FIG. 3.
Figure 5:
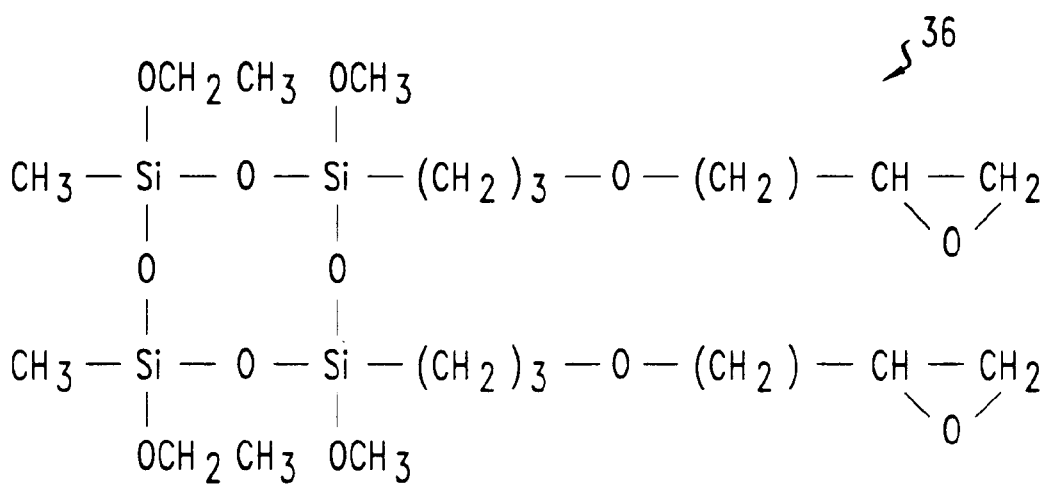
FIG. 5 shows an organosilicate molecule produced by crosslinking two of the molecules of FIG. 4.

In the exemplary embodiment, preparing the prehydrolyzed sol-gel material involves mixing MTEOS and GLYMO monomers with a 15% stoichiometric amount of water. Enough HCl is added to the solution to produce a solution whose PH in the range of about 2–5. The resulting solution is stirred for about 15 minutes at a temperature of about 273 Kelvin to start hydrolysis of the alkoxides. The hydrolysis reaction produces primarily the amphiphilic organosilicate monomers 34 shown in FIG. 4. Next, the solution is heated to about 295 Kelvin and more water is added. This causes further hydrolysis and produces the amphiphilic organosilicate molecules 36 that are partially crosslinked as shown in FIG. 5. Stirring for about 1 hour completes the hydrolysis of alkoxide groups and produces the prehydrolyzed sol-gel material used in above step 44.

Figure 6:
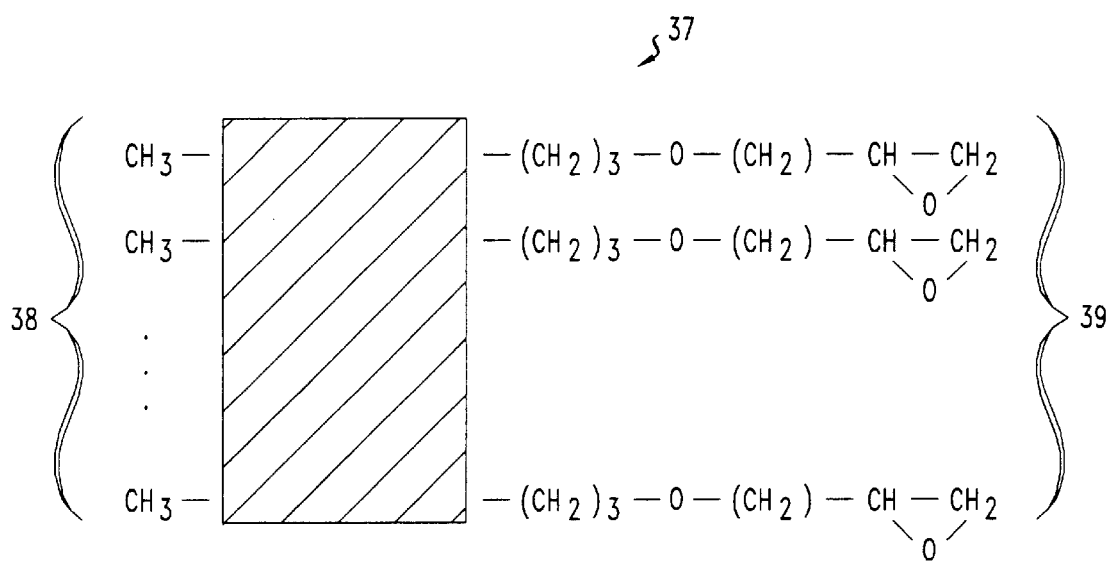
FIG. 6 illustrates the form of an organosilicate precursor made by further crosslinking molecules of FIG. 5 during prehydrolysis of a sol-gel material.

Referring to FIG. 6, complete prehydrolysis produces additional crosslinking so that the final organosilicate precursors 37 of the prehydrolyzed sol-gel solution have higher molecular weights. Exemplary weights are about 2 to about 200 times the weight of organosilicate monomer 34 of FIG. 4. These partially crosslinked organosilicate precursors 37 are still amphiphilic, because separate physical regions 38, 39 of the precursor 37 have concentrations of hydrophobic ($CH_3$) moieties and concentrations of hydrophilic $OCH_2$ ($CHCH_2O$) moieties, respectively.

Referring again to FIG. 3, method 40 includes mixing the prehydrolyzed sol-gel solution with the starting solution of PBu-b-PEO to form a mixture for casting, spin-coating, or dip-coating (step 46). After mixing, the mixture is typically stirred for about 2 hours to get a homogeneous solution. Then, the final mixture is either cast, spin-coated, or dip-coated on a selected substrate to produce a film of a desired thickness (step 48).

The method 40 includes baking the cast, spin-coated, or dip-coated film to evaporate remaining solvent until the PBu-b-PEO template molecules self-assemble into a phase with a mesoscopic structure therein (step 50). The bake step maintains the film at a temperature slightly higher than the boiling point of the solvents until the solvent evaporates. Films produced by the casting, spin-coating, or dip-coating step 46 are typically thin enough so that bubbling can be avoided during the evaporation. Bubbling could otherwise, generate cracks in the film. Exemplary evaporate conditions for a 50/50 volume % solvent mixture of chloroform and tetrahydrofuran involve maintaining the film at a temperature in the range of about 333 Kelvin to about 343 Kelvin. At the desired PBu-b-PEO concentration, the PBu-b-PEO molecules and the organosilicate precursors spontaneously condense to form one of the composites 2, 8, 14 of FIG. 1A, 1B, or 1C. The mesoscopic structure of the composite depends on the concentrations of PBu-b-PEO and organosilicate precursors, the integers n and m characterizing the chain lengths of blocks in PBu-b-PEO, the molecular weights of the organosilicate precursors, and the temperature.

The method 40 also includes baking the film at a higher temperature to cause crosslinking of the condensed organosilicate precursors and produce an crosslinked organosilicate solid, i.e., a solid film (step 52). This higher temperature is about 403 Kelvin, and the bake is continued for a period of about 45–60 minutes. The bake cures the composite by producing an organosilicate solid that is fully crosslinked by siloxane crosslinks.

Since crosslinking causes the organosilicate precursors to shed alkoxide functional groups, the organosilicate precursors become less hydrophilic and more hydrophobic as curing progresses. Nevertheless, curing does not cause shedding of the hydrophilic epoxide-type ($CH_2(CHCH_2O)$ moieties or the hydrophobic $CH_3$ moieties under the conditions of the crosslinking bake. Curing also does not change the affinities of these moieties for water. For this reason, the organosilicate precursors remains amphiphilic during the bake and do not undergo a changes in their affinity for water during the cure. Avoiding changes in affinities of the precursors for water avoids destroying the previously template-produced mesoscopic structure in the organosilicate composite.

In comparison, an organosilicate composite made by a sol-gel material made by hydrolyzing only $(CH_3)Si(OCH_2CH_3)_3$ monomers will have organosilicate precursors that are hydrophilic before curing and become hydrophobic, i.e., as $(OCH_2CH_3)$ moieties are shed during curing. In a composite produced from such precursors, portions of organosilicate precursors that were intermingled with or neighboring to hydrophilic regions of block polymers during template-induced formation of a mesoscopic structure will become uncomfortable with their physical locations as curing progresses. These organosilicate precursors move during curing and destroy the previously formed mesoscopic structure in the organosilicate portion of the composite. A composite of organosilicate precursors made by crosslinking the alkoxide $(CH_3)Si(OCH_2CH_3)_3$ alone will produce a cured organosilicate solid without mesoscopic structure, because the organosilicate precursors become hydrophobic as their affinities for water change during the cure.

The method 40 also includes treating the crosslinked solid to chemically remove the block copolymer molecules that were previously used as a template for the mesoscopic structure (step 54). Possible treatments include burning, ozonolysis, and $O_2$ plasma RIE. After removing the block copolymer molecules or portions the remaining solid is porous. Some embodiments leave the pores in the solid empty in applications, e.g., to make porous membranes for use as filters. Other embodiments refill the pores with materials such as semiconductors, metals, and/or dyes for various uses.

Figure 7:
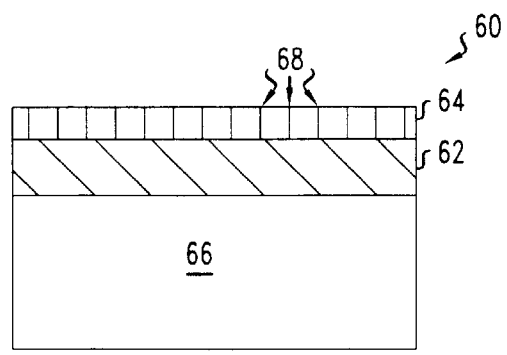
FIG. 7 is cross-sectional view of a planar waveguide that uses a porous organosilicate material produced by the method of FIG. 3.

FIG. 7 is a cross-sectional view of a planar waveguide 60 that uses a porous organosilicate solid that was fabricated by method 40 of FIG. 3. The waveguide 60 includes an optical core layer 62, an upper optical cladding layer 64, and a substrate 66 that functions as a lower optical cladding layer. The upper optical cladding layer 64 is a porous organosilicate solid that was fabricated by method 40 of FIG. 3. The porous nature of upper optical cladding layer 64 produces a very low optical refractive index therein. In the upper optical cladding layer 64, exemplary refractive indexes potentially have low values in the range of about 1.1 to about 1.3 due to the porous nature of the organosilicate solid. These refractive index values are lower than the approximate values of 1.3–1.4 for refractive index that in obtainable by fluorine doping polymers. Such low refractive indexes aid to produce a high refractive index contrast between the upper optical cladding layer 64 and the optical core layer 62 of the planar waveguide 60. Optical waveguides with high contrasts in refractive indexes between the optical core and cladding layers are known as a high delta waveguides. High delta waveguides are advantageous for some applications. The low refractive indexes in optical cladding layer 64 also enable using lower refractive indexes in optical core layer 62.

In the planar waveguide 60, the template-based fabrication process has concentrated hydrophobic moieties of organosilicate precursors on the exterior of the optical cladding layer 64. The presence of such hydrophobic moieties enables the layer 64 to protect the planar waveguide 60 from absorption of ambient water without additional protective layers. Water absorption especially into the optical core layer 62 could produce significant optical losses, e.g., at optical telecommunication wavelengths of about 1.3 microns to about 1.6 microns. The hydrophobicity of the upper optical cladding layer 64 eliminates the need for additional waterproof coatings to protect the optical core layer 62 from absorbing such damaging moisture.

Other embodiments of the invention will be apparent to those of skill in the are in light of the specification, drawings, and claims of this application.

What we claim is:

1. A method, comprising:
   providing a solution of amphiphilic template molecules;
   mixing amphiphilic organosilicate precursors into the solution to form a mixture; and
   evaporating solvent from the mixture to produce an organosilicate composite with a mesoscopic structure;
   curing the composite in a manner that crosslinks at least a portion of the organosilicate precursors; and wherein the amphiphilic organosilicate precursors remain amphiphilic during curing.

2. The method of claim 1, further comprising:
   forming a film of the mixture prior to completion of the evaporating.

3. The method of claim 1, wherein the template molecules are amphiphilic block copolymer molecules.

4. The method of claim 1, wherein the crosslinking releases hydrophilic moieties from a portion of the organosilicate precursors.

5. The method of claim 1, further comprising:
   performing a chemical treatment that removes a portion of the template molecules from the cured composite.

6. The method of claim 1, wherein hydrophobic moieties bonded to the organosilicate precursors and hydrophilic moieties bonded to the organosilicate precursors are concentrated in separate physical regions of the cured composite.

7. The method of claim 1, wherein the mesoscopic structure includes a dispersion of a micro-structures of a type selected from a group consisting of cylindrical micro-structures, lamellar micro-structures, gyroid micro-structures, and spherical micro-structures.

8. A method comprising:
   forming a composite with an internal structure by evaporating solvent from a solution comprising amphiphilic block copolymer molecules and amphiphilic organosilicate precursors; and crosslinking a portion of the organosilicate precursors of the composite to form an organosilicate solid; and wherein the crosslinking conserves an amphiphilic nature of at least a portion of the organosilicate precursors incorporated into the solid.

9. The method of claim 8, further comprising one of casting, dip-coating, and spin-coating a film of the solution on a substrate prior to completion of the forming a composite.

10. The method of claim 8, wherein the crosslinking produces siloxane bonds between the portion of the organosilicate precursors and causes the portion to shed alkoxide groups.

11. The method of claim of claim 8, further comprising:

chemically extracting block copolymer molecules from the solid to create pores or voids in the solid.

12. The method of claim 11, wherein the pores or voids are hydrophilic and portions of the matrix distant from the pores or voids are hydrophobic.

13. The method of claim 8, wherein the internal structure includes a dispersion of one type of micro-structures in the composite, the type of micro-structures being selected from a group consisting of cylinders, lamellae, gyroids, and spheres.

* * * * *